A. E. LEWIS.
DRIVING MEANS.
APPLICATION FILED JUNE 7, 1917.
1,278,485.
Patented Sept. 10, 1918.
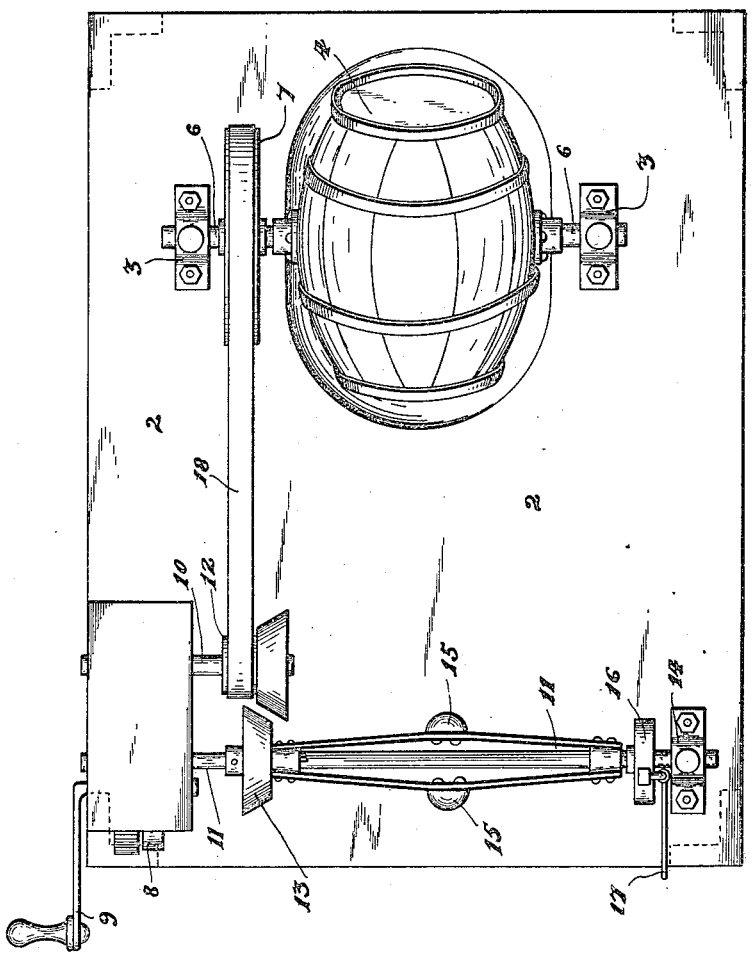
Witnesses
J. D. Berry
J. McGrath
Inventor
Alonzo. E. Lewis.
By Harold
Atty.

UNITED STATES PATENT OFFICE.

ALONZO EDWARD LEWIS, OF INGERSOLL, ONTARIO, CANADA.

DRIVING MEANS.

1,278,485.   Specification of Letters Patent.   Patented Sept. 10, 1918.

Application filed June 7, 1917. Serial No. 173,431.

*To all whom it may concern:*

Be it known that I, ALONZO E. LEWIS, a citizen of the Dominion of Canada, residing at Ingersoll, in the county of Oxford and Province of Ontario, have invented certain new and useful Improvements in Driving Means, of which the following is a specification.

This invention relates to driving means, and has for its object to provide a simple and inexpensive means for operating churns, more preferably for use where motor or gasolene engines are not commonly used, owing to the requirements necessary to run them.

Referring to the drawing, numeral 2 designates a platform which may be mounted on any suitable corner posts. 3 indicates a set of journals which are positioned opposite each other near the front of platform 2. 4 is a barrel churn having a central axle 6 extending out on opposite sides of the churn and turns in the journals 3. On one side I provide a drive wheel 7 which is mounted on the axle 6. At the opposite or rear end of the platform 2, I provide a spring motor mechanism 8 which is adapted to be wound up by a crank 9. 10 and 11 are respective shaftings extending out from the inner side of the casing which holds the spring motor mechanism 8. 12 is a drive wheel mounted on a shaft 10 and provided with a beveled flange on its outer side. 13 is a beveled speed-regulating wheel which is loosely mounted on a shaft 11. The shaft 11 extends across the rear end of the platform and its outer end turns in the journal 14. The governor 15 is securely attached to the shaft at its outer end and attached at its inner end to the speed-regulating wheel 13. 16 is a brake wheel mounted on the shaft 11, and 17 is a brake lever for stopping the driving means. 18 is a belt between the wheels 7 and 12.

In operating this driving means the cream is put in the churn and the top tightened down in the usual manner. The spring motor mechanism is now wound up by the crank 9. This mechanism is provided with a series of varied sized gears or other means whereby the shafts 10 and 11 will be rotated at considerable speed. These shafts turn in opposite directions to each other. When the shaft 11 gets turning at a high speed the governor 15 will expand and pull the speed regulating wheel 13 out so that its beveled face will engage against the bevel on the wheel 12. This will cause the speed to stay at the same rate and will not allow the spring motor mechanism 8 to rise.

In my drawing, which is only for illustration purposes, I show a churn, but I do not limit myself to this only as this driving means may be used to good advantage in many other uses without departing from the scope of the claims.

What I claim as new, is,—

1. A platform, a shaft journaled thereon, a drive wheel on said shaft, a spring motor mechanism, parallel shafts extending out from the motor casing, a belt connection from one of said shafts to the first-named shaft, a governor carried by the other of said shafts, a beveled speed-regulating wheel loosely mounted on said shaft, a coöperating beveled member on the other of said parallel shafts, and a rotatable device carried by the first-named shaft.

2. A platform, a shaft journaled thereon, a drive wheel on said shaft, a spring motor mechanism and its casing, parallel shafts extending outward from said casing, a drive wheel on one of said shafts and a beveled flange carried by said drive wheel, a belt connecting said drive wheel, a governor fixedly secured at one end to the other of the parallel shafts, a beveled speed-regulating wheel loosely mounted on said shaft and attached to the governor, a brake wheel mounted on said shaft, and a brake lever for coöperation with said brake wheel for stopping the driving mechanism.

In testimony whereof I affix my signature in the presence of two witnesses.

ALONZO EDWARD LEWIS.

Witnesses:
  LEWIS HAROLD SMITH,
  A. MACAULAY.

Copies of this patent may be obtained for five cents each, by addressing the "Commissioner of Patents, Washington, D. C."